United States Patent [19]
Kalman

[11] 3,807,870
[45] Apr. 30, 1974

[54] APPARATUS FOR MEASURING THE DISTANCE BETWEEN SURFACES OF TRANSPARENT MATERIAL

[76] Inventor: Gabor Ujhelyi Kalman, P.O. Box 95, Farmington, Conn. 06032

[22] Filed: May 22, 1972

[21] Appl. No.: 255,332

[52] U.S. Cl.......... 356/161, 356/239, 250/219 WD, 250/219 TH, 250/220 M
[51] Int. Cl...................... G01b 11/00, G01b 11/06
[58] Field of Search.......... 356/161, 209, 239, 240; 250/219 WD, 219 TH, 220 M

[56] References Cited
UNITED STATES PATENTS

| | | | |
|---|---|---|---|
| 3,307,446 | 3/1967 | Rottman | 356/161 |
| 3,428,817 | 2/1969 | Hofmeister et al. | 250/219 WD UX |
| 3,690,774 | 9/1972 | Kottle et al. | 356/209 UX |
| 3,259,022 | 7/1966 | Vietorisz | 250/219 WD UX |

FOREIGN PATENTS OR APPLICATIONS
1,207,976  10/1970  Great Britain...................... 356/161

Primary Examiner—Ronald L. Wibert
Assistant Examiner—Paul K. Godwin
Attorney, Agent, or Firm—Reising, Ethington & Perry

[57] ABSTRACT

A thickness measuring instrument is disclosed which is of the optical type and adapted for transparent workpieces such as plastic or glass sheets or containers. The instrument utilizes a light beam which is reflected from both front and rear surfaces of the workpiece to be measured and the separation between the reflected beams is taken as a measure of the thickness. The separation between reflected beams is measured by means of a fixed linear array of sensors in the form of photodiodes which are electronically scanned to produce trigger voltages with time intervals therebetween corresponding to the distance between reflected beams. A measurement circuit in either analog or digital form accepts the trigger signals and converts the time interval therebetween into a digital signal or an analog voltage which corresponds to the thickness being measured.

18 Claims, 9 Drawing Figures

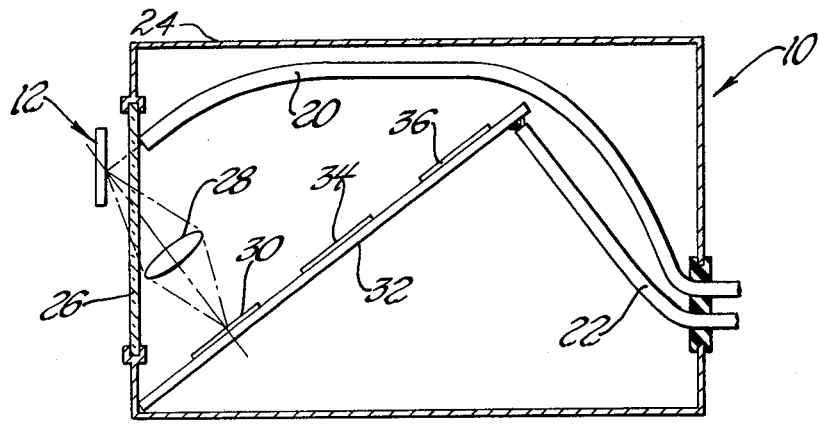
Fig. 1
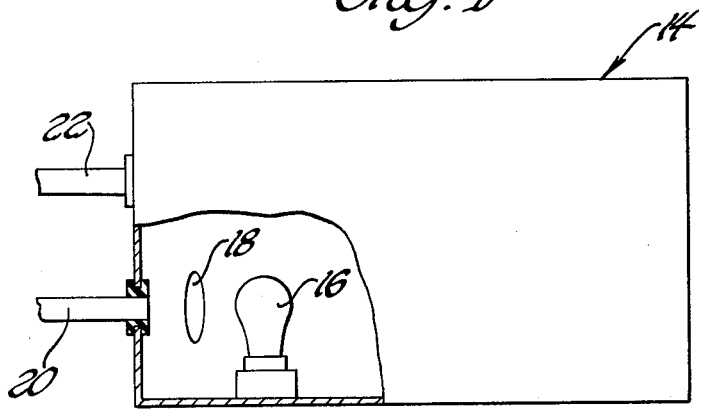
Fig. 2
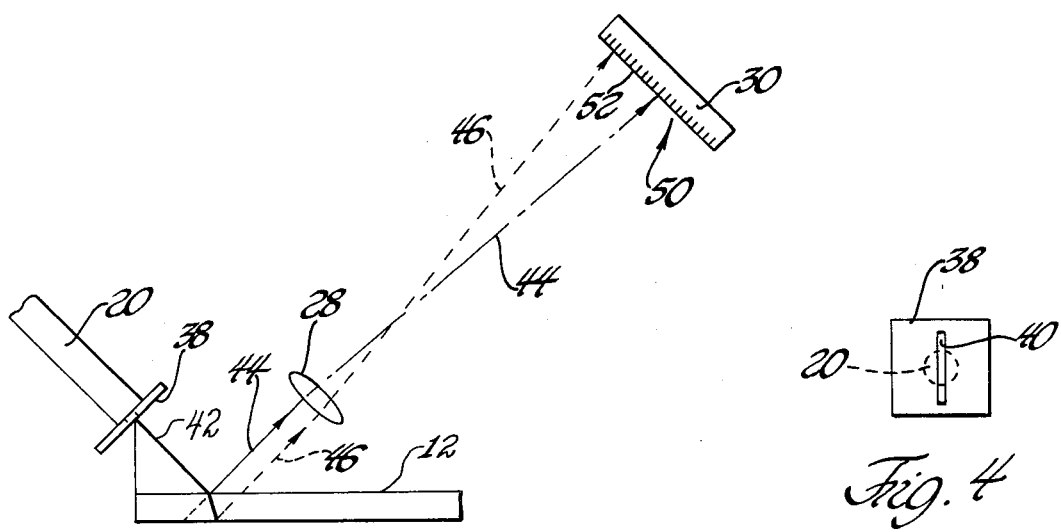
Fig. 3
Fig. 4

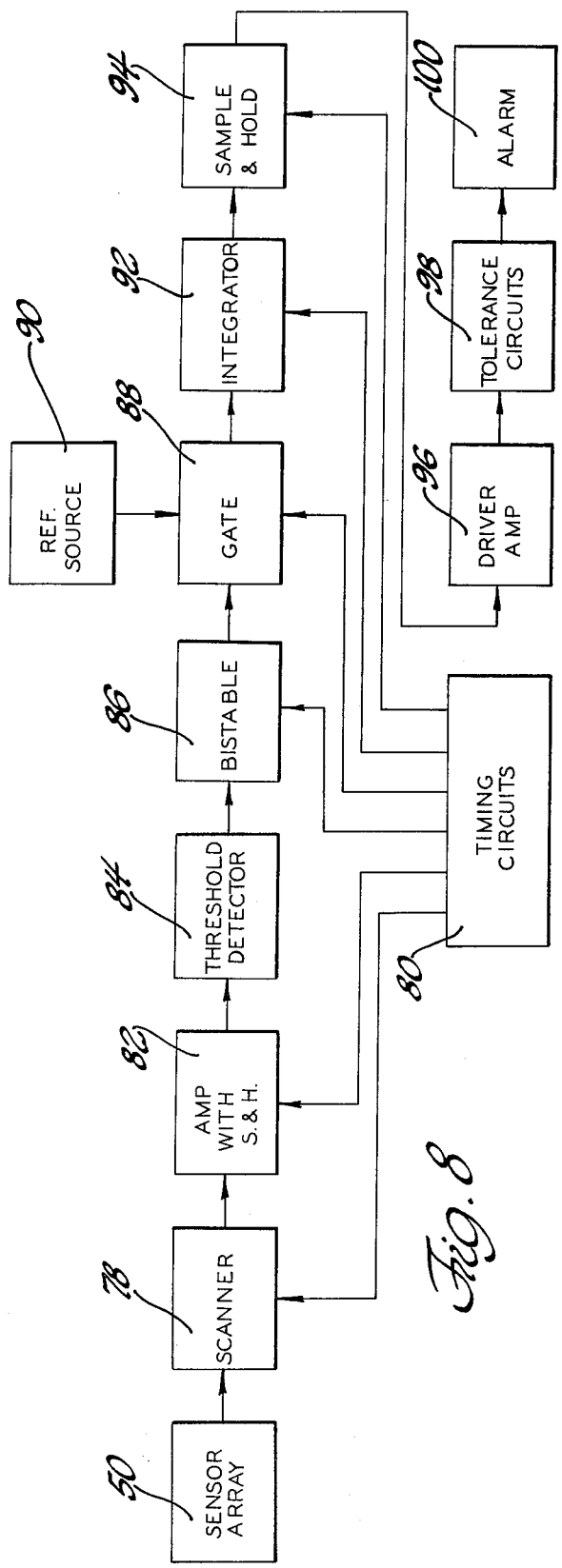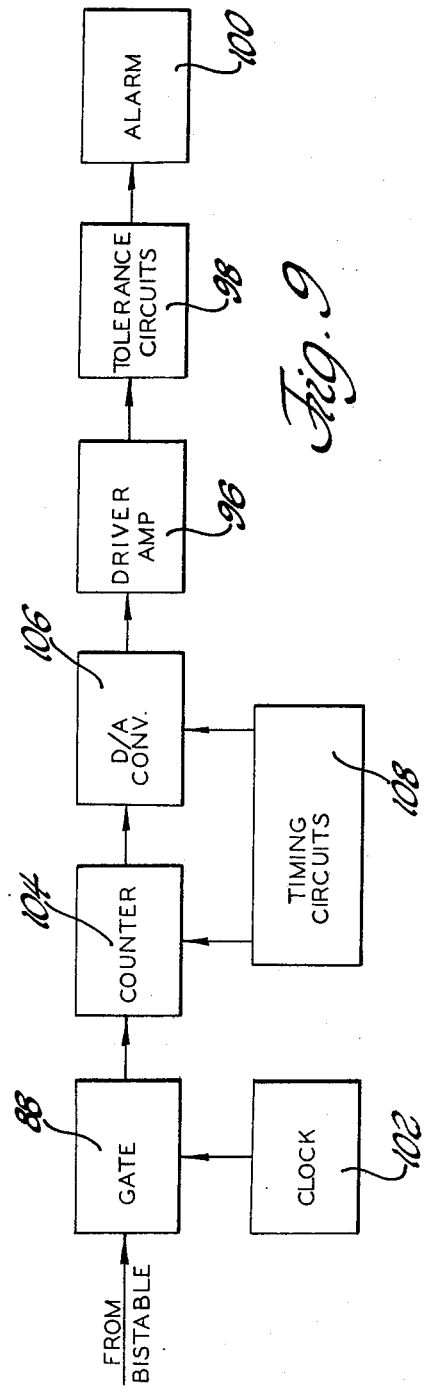

APPARATUS FOR MEASURING THE DISTANCE BETWEEN SURFACES OF TRANSPARENT MATERIAL

This invention relates to distance measuring instruments and more particularly to such instruments of the optical type which are especially adapted for thickness measurement of transparent material.

It is already known in principle that the thickness of a transparent material may be measured by projecting a light beam onto the material at an acute angle and measuring the separation between the images or beams which are reflected from the front and back surfaces of the material. Such a technique lends itself admirably to certain industrial processes such as the manufacture of transparent plastic or glass sheet. In general, the technique is applicable to the measurement of distance between reflective surfaces in a light transmitting medium and it is especially useful for thickness measurement where it is desired to achieve the measurement without physically contacting the material or where it is accessible from only one side.

In previous efforts to apply this technique of distance measurement, there has been considerable complexity and difficulty in achieving the measurement of reflected image separation. In the prior art it has been proposed to achieve thickness measurement of transparent material by directing a scanning beam of light onto the surface of the material so that a first beam is reflected from the near surface and a second beam is reflected from the far surface of the material. The reflected beams are detected by a photocell which is positioned behind a fixed mask defining a light admitting slit. The scanning motion of the incident beam on the surface of the material causes the reflected beams to traverse this slit in succession and thus impinge on the photocell with a time lapse therebetween corresponding to the separation of the reflected beams and hence the thickness of the material. This arrangement requires a rotating prism or the like for producing the scanning beam which impinges on the surface of the workpiece. It has also been proposed in the prior art to measure thickness of transparent workpieces by an optical system which projects a fixed beam of light onto the surface of the workpiece so that a reflected beam emanates from each of the near and far surfaces. The reflected beams are directed onto a fixed photocell through a slit in a rotating mask so that they impinge upon the photocell in time succession corresponding to their separation in space. One difficulty with these prior art arrangements is the requirement for mechanical movement, such as a motor driven mask or prism to produce the scanning motion required for translating the separation of the reflected beams into a time interval which may be taken as a measure of the thickness of the workpiece. This requirement for moving parts imposes a limitation upon a scanning rate and hence the number of measurements per unit time, which is of special importance in monitoring the thickness of a moving workpiece. Furthermore, such mechanical scanning systems are subject to wear, environmental conditions such as vibration, and require considerable maintenance.

In accordance with the present invention, a thickness measurement instrument is provided which utilizes the principle of front and back surface reflection and achieves measurement of the image or beam separation without the need for mechanical motion. This is accomplished using a fixed beam directed onto the surfaces of the workpiece and using a fixed sensing means in the form of multiple radiation responsive elements. More particularly, in accordance with the invention, the radiation responsive elements are disposed in an array which extends across the paths of the reflected beams. Detector means are connected with the sensing means for detecting which of the elements are intercepted by the beams and the distance between the intercepted elements is taken as a measure of the distance between the front and back surfaces of the workpiece. Preferably measuring means are connected with the detector means for producing an electrical signal corresponding to the distance between the intercepted elements. The radiation responsive elements, preferably in the form of photodiodes of exceedingly small dimension produce electrical signals corresponding to the amount of radiation impinging thereon and are connected sequentially to a threshold detector by electronic scanning means.

Further, in accordance with the invention, the scanning of the array of elements is achieved electronically at a rate which exceeds the practical limits of mechanical scanning. The threshold detector produces a trigger voltage when the signal of a given element exceeds a threshold value and accordingly a pair of trigger signals are produced by the threshold detector during each scan of the array. The time elapsed between the trigger signals during a single scan is measured by timing means which preferably include variable voltage means for producing a voltage proportional to the time lapse.

According to the invention, the measuring means for translating the time interval between successive trigger signals into a signal corresponding to thickness or distance may take the form of either an analog circuit or a digital circuit. In the analog measuring means a reference voltage source is gated to an integrator on the occurrence of the first trigger signal and the gate is closed upon the occurrence of the second trigger signal so that the voltage developed by the integrator corresponds to the thickness of the workpiece. In the digital circuit a clock pulse generator is gated to a counter upon the occurrence of the first trigger signal and the gate is closed upon the occurrence of the second trigger signal, so that the count registered by the counter corresponds to the thickness of the workpiece.

According to the invention, the measuring instrument may comprise a sensing head of very small dimensions which is positioned immediately adjacent the workpiece and a main chassis or cabinet which is positioned remotely from the workpiece. The sensor head functions to project a light beam onto the workpiece and to receive the reflected beams on the sensing means. A high intensity light source is disposed in the main cabinet and the light is piped through a fiber optics cable to the sensing head for projection onto the workpiece. The sensing means preferably takes the form of an integrated circuit photodetector array with an integrally connected scanner which is connected by electric cable to the main cabinet, which houses the associated electronics. By this arrangement the sensor head is free of the heat generated by the light source and the space required is exceedingly small and the head can be accommodated readily at the desired location on a production line for monitoring thickness of workpieces. This arrangement also makes possible an optical system which measures thickness to a high degree of accuracy with a measurement rate within the range of several thousand measurements per second. It is especially well adapted for the measurement of wall thickness in the manufacture of plastic or glass workpieces, including pipes and bottles with curved walls and with surfaces which are somewhat uneven. Further, the accuracy of measurement is unaffected by substantial variation in the spacing of the sensing head from the workpiece. The sensitivity of the instrument may be changed by a simple change in the optical system.

A more complete understanding of this invention may be obtained from the detailed description which follows, taken with the accompanying drawings in which:

FIG. 1 is a diagrammatic representation of the sensor head of the measuring instrument;

FIG. 2 is a view of the main chassis of the measuring instrument;

FIG. 3 is a diagram of the beam paths of the instrument;

FIG. 4 shows a detail of construction;

FIG. 8 is a block diagram of the electronic measuring system; and

FIG. 9 is a block diagram of a modification.

Figure 5:
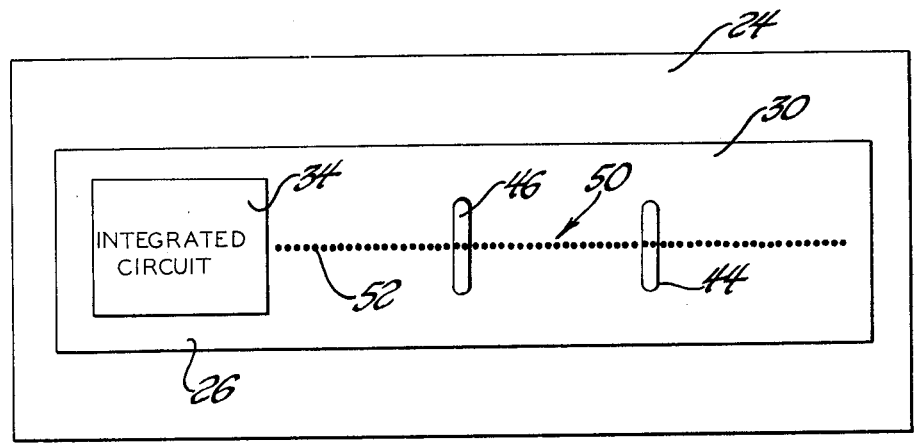
FIG. 5 is a view of the sensing element array.

Referring now to the drawings, there is shown an illustrative embodiment of the invention in a thickness measuring instrument especially adapted for continuously monitoring the thickness of workpieces, such as plastic containers on the production line. The measuring instrument embodying the invention effects measurement of wall thickness by measuring the separation between front and rear surface relfections. When a beam of light is projected at an acute angle onto the surface of a transparent plate, both the front and rear surfaces reflect a portion of the light beam and accordingly a double image of the beam is reflected. The separation of the two images or reflected beams is a function of the index of refraction of the material, the angle of incidence of the light beam and the thickness of the material. For a given material and a constant angle of incidence, the distance between the reflected beams is proportional to the thickness of the plate.

As shown in FIGS. 1 and 2, the measuring instrument comprises a sensor head 10 which is disposed immediately adjacent a workpiece 12 and a main chassis or cabinet 14 which is suitably disposed at a location several feet remote from the sensor head 10. The cabinet 14 houses a high intensity light source 16 and radiant energy therefrom is transmitted through a lens 18 to the input end of a fiber optics cable 20 which extends to the sensor head 10. The main cabinet 14 and the sensor head 10 are also interconnected by an electrical cable 22.

The sensor head 10 comprises a sealed housing 24 which may be in the order of two to four inches in height, width and depth. The sensor head housing includes a window 26 of transparent material such as quartz and which is positioned opposite the workpiece 12 and spaced therefrom by a distance on the order of one-half inch. The workpiece 12 in the illustrative example suitably takes the form of the wall of a container made of transparent material. The fiber optics cable 20 terminates with its output end adjacent the window 26 at one side thereof and inclined at an acute angle with respect thereto. A focusing lens 28 is positioned inside the window 26 so that a light beam projected from the cable 20 onto the workpiece 12 and reflected from the front and rear surfaces of the workpiece will be intercepted thereby. The reflected beams are focused by the lens 28 onto a sensor board 30 which will be described in greater detail subsequently. The sensor board 30 is mounted upon the surface of a printed circuit board 32 which is provided with additional integrated circuits 34 and 36.

Referring now to FIGS. 3, 4 and 5, the optical paths of the light beams are shown in greater detail with reference to the sensor board 30. For reasons which will appear hereinafter it is desirable to project a line of light, i.e., a beam with a cross section which is long relative to its width. For this purpose the fiber optics cable 20 is provided with an opaque mask 38 which includes a slit 40 so that a single beam is projected therefrom with a width of approximately 0.01 inch. Such a beam could also be formed by a cylindrical lens. The beam 42 is directed onto the surface of the workpiece 12 at an acute angle and a portion thereof is reflected from the front surface of the workpiece as a reflected beam 44 while another portion thereof passes through the material of the workpiece and is reflected from the rear surface thereof as reflected beam 46. Since the beam 42 is not collimated but is constituted of divergent rays in the illustrative embodiment, the reflected beams are also constituted of divergent rays. However, for explanatory purposes, the diagram of FIG. 3 represents the beams by single lines which may be regarded as selected rays, which in the respective beams 44 and 46, are parallel to each other. The same diagram would represent the optical system if the beam 42 were collimated in which case the lines would represent the axes of collimated beams. As used herein, the term "reflected beams" means the reflected images of the source of light.

The reflected beams 44 and 46 are generally parallel to each other and are spaced apart by a distance proportional to the thickness of the workpiece 12. The lens 28 focuses the beams 44 and 46 onto a linear array 50 of radiation responsive elements 52 disposed on the surface of the sensor board 30. As shown in the enlarged view of FIG. 5 the array 50 comprises a multiplicity of photosensitive elements 52 disposed in a straight line and in closely spaced relationship. In a particular embodiment of the invention the sensor board, including the photosensitive elements, takes the form of an integrated circuit containing 64 photosensitive elements, each of which are approximately 0.002 inch square and spaced with centers 0.002 inch apart. Such an integrated circuit is currently available from the Reticon Corporation of California. It is noted in FIG. 5 that the beams 44 and 46 are of a cross sectional dimension such that each beam illuminates more than one of the photosensitive elements at a time.

Figure 6:
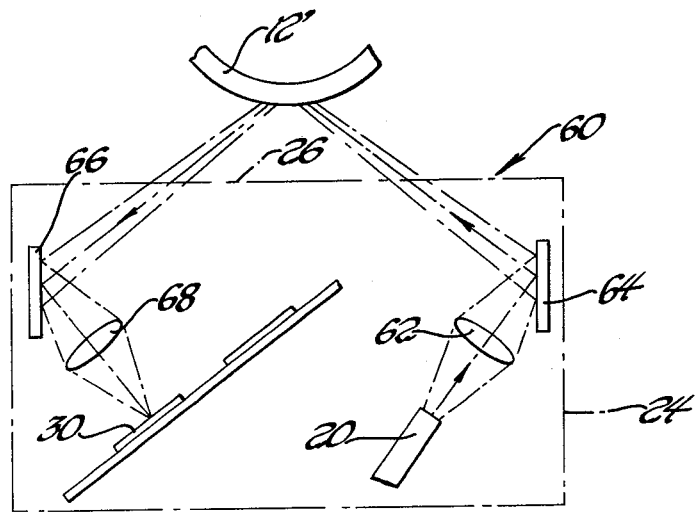
FIG. 6 is a diagrammatic representation of an alternative embodiment of the optical system.

Referring now to FIG. 6, there is shown a modified sensor head 60 which is especially adapted for measuring the wall thickness of a workpiece 12' such as a container having a curved wall, which is spaced farther from the sensor head, say several inches. The fiber optics cable 20 is positioned rearwardly in the housing 24 and the beam therefrom as formed by the mask 38 is projected through a lens 62 onto a front surface mirror 64 from which it is reflected through the window 26 onto the surface of the workpiece 12'. Another front surface mirror 66 is disposed on the opposite side of the sensor head in a position to intercept the reflected beams from the front and rear surfaces of the workpiece 12'. The reflected beams are redirected by the mirror 66 through a focusing lens 68 onto the surface of the sensor board 30. Except for the optical transmission path, as just described, the modified sensor head 60 is the same as the sensor head 10 described with reference to FIG. 1.

Figure 7:
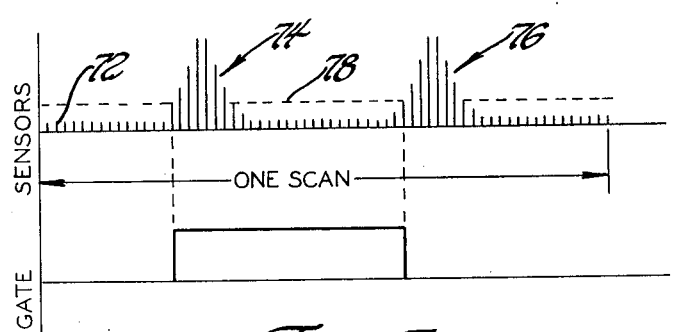
FIG. 7 is a graphical representation of electronic signals to aid explanation of the operation of the instrument.

The electronic circuits of the measuring instrument will now be described with reference to FIGS. 7, 8 and 9. In the preferred embodiment, the electronic circuits in general comprise sensor scanning circuits which operate to produce trigger signals which are separated by a time interval proportional to the physical separation of the reflected beams or images and also comprise a measurement circuit which operates to convert the timed trigger signals into electronic signals having magnitude corresponding to the separation of the beams, and hence thickness of the material. The sensor scanner circuits, together with an analog measurement circuit, is shown in FIG. 8. In the sensor array 50 previously described, each of the photodiodes 52 functions in a charge-storage mode and hence is effective to integrate the light intensity falling thereon. This effect is graphically represented in FIG. 7 which shows the relative charges developed by the photodiodes. In the exemplary system mentioned above, with a 64 element array as depicted in FIG. 5 each vertical line 72 corresponds to one of the photodiodes 52 and for explanatory purposes each of the photodiodes is shown as having accumulated at least a minimal charge thereon. Those photodiodes which are illuminated by the reflected beam 46 accumulate a significantly higher value of charge and produce a pulse 74. Similarly, the reflected beam 44 produces a pulse 76. It is noted that the reflected beams 44 and 46 exhibit a nonuniform space distribution of intensity, such that a peak value occurs on the central axis of the beams and the same distribution is exhibited by the pulses 74 and 76 in the illustrated example.

The scanner 78 is shown for convenience as a discrete block in the diagram of FIG. 8, but in practice it is preferably part of the integrated circuit of the sensor array 50. In this arrangement each of the photodiodes is gated separately and in sequence by the scanner 78 which, in the example referred to, comprises a clock controlled shift register. Accordingly, clock or timing circuits 80 provide a clock pulse input to the scanner 78. The output of the scanner is applied to the input of an amplifier 82 which includes a sample and hold circuit to facilitate subsequent signal processing. The sample and hold circuit operates to detect and hold the peak value of each individual pulse and in effect provides a staircase waveform for the pulses 74 and 76. The timing circuits 80 are connected with the sample and hold circuit of amplifier 82 to reset the same to zero just before the gating of the next photodiode. The output of the amplifier 82 is applied to a threshold detector 84 which is a leading edge detector adapted to produce a trigger pulse on the occurrence of a predetermined threshold value 78 during a voltage rise. Accordingly, each pulse 74 and 76 of FIG. 7 will cause the threshold detector 84 to produce a single trigger voltage. The threshold detector 84 is preferably a two-stage detector in which the second stage performs threshold detection on the output of the first stage to provide a higher degree of certainty in the determination of occurrence of the threshold value. The output of the threshold detector 84 is applied to a bi-stable trigger circuit 86 which produces switching trigger voltages corresponding to the threshold trigger voltages. The output of the bi-stable trigger circuit 86 is applied through the gate input of a gate circuit 88 and accordingly the gate is opened on the first occurrence of the threshold value and closed upon the second occurrence thereof during each scan, as shown in FIG. 7. The bi-stable trigger circuit 86 and the gate circuit 88 are separately connected with the timing circuits 80 for the purpose of resetting the trigger circuit 86 at the end of each scan and for closing the gate circuit 88 at the end of each scan. Although this operation is not essential, it is provided to add an extra measure of certainty of operation in the unlikely event that a second occurrence of the threshold value during a given scan would be undetected by the threshold detector.

Although the preferred embodiment as just described comprises a scanning system, it will be appreciated that the desired thickness measurement may be achieved by use of a threshold detector connected with each of the radiation responsive elements so that, by means of static logic, the distance between the reflected beams is indicated.

The gate circuit 88 may be regarded as the first stage of the measurement circuit which is adapted to convert the timed trigger voltages into an analog voltage having a magnitude corresponding to the thickness of the workpiece being measured. A reference source 90, preferably a constant current source, is connected with the input of the gate 88 which has its output connected with the input of an integrator 92. The integrator 92 is operative to develop a ramp voltage which has a magnitude proportional to the time that the reference source 90 is connected thereto through the gate 88. Accordingly, the integrator 92 develops an output voltage which is proportional to the time interval between the trigger pulses and hence the thickness of the workpiece. The timing circuits 80 are connected to the integrator 92 for the purposes of resetting the integrator to zero at the end of each scan. The output of the integrator 92 is applied to the input of a sample and hold circuit 94 which memorizes or stores the maximum value of voltage achieved by the integrator during a given scan. The timing circuits 80 are connected with the sample and hold circuit 94 for the purpose of dumping or resetting the memory element thereof just prior to the succeeding scan. The memorized voltage of the sample and hold circuit is applied to the input of a driver amplifier 96 which is a high input impedence or buffer amplifier. The driver amplifier 96 is preferably provided with gain adjustment so that calibration may be effected to provide a voltage output which is related by a given scale factor to the thickness of the workpiece being measured. The output of the driver amplifier is applied to a utilization device which in the illustrative embodiment comprise tolerance circuits 98 which are preset to establish acceptable limits of the workpiece. The tolerance circuits 98 are connected with an alarm 100, suitably in the form of signal lamps, which are selectively energized when the workpiece thickness is either above or below the acceptable limits.

Referring now to FIG. 9, a modification of the measurement circuit will be described. In this circuit arrangement digital techniques are employed to convert the time interval between trigger pulses into an electrical signal corresponding to thickness of the workpiece. The trigger signals from the bi-stable trigger circuit 86 are applied to the gate input of the gate circuit 88, as previously described. A clock circuit 102 which produces clock pulses at the same rate as the clock pulses which advance the scanner from element to element are applied to the other input of the gate circuit 88. The output of the gate circuit 88 is applied to a counter 104 which registers a count corresponding to the number of clock pulses which occur while the gate circuit 88 is open. The registered count thus corresponds to the number of photodiodes which span the distance between the reflected beams and which correspond to the thickness of the workpiece. The ultimate output of the instrument may be in digital form such as a display of the registered count, if desired. However, in the preferred embodiment the output of the counter 104 is applied to a digital to analog converter 106 which produces an analog output voltage having a magnitude corresponding to the registered count and hence to the thickness of the workpiece. Timing circuits 108 are connected with the counter 104 and converter 106 respectively to reset the same to zero at the end of each scan. The output of the converter 106 is applied to the driver amplifier 96 and the output thereof corresponding to workpiece thickness is applied to the tolerance circuits 98 and alarm 100, as previously described.

In operation of the inventive measuring instrument the sensor head is positioned relative to the workpiece as shown in FIG. 1 or alternatively as shown in FIG. 6. In either case the receiving lens 28 or the receiving lens 68 respectively, is positioned to focus the reflected beams or images onto the sensor array 50 of the sensor board 30. The sensitivity of the measuring instrument is determined in part by the focal length of the receiving lens and can be increased by utilizing a lens of shorter focal length. With the measuring instrument energized for operation, the scanner 78 repeatedly scans the photodiodes of the array at a fixed rate. Each individual scan represents an independent measurement of the thickness since the separation of the beams 44 and 46 is measured during each scan. The position of the beams 44 and 46, as shown in FIG. 5, are represented by the photo-diode generated pulses 76 and 74 respectively, as shown in FIG. 7.

At this point it is to be noted that the instrument measures separation between the reflected beams 44 and 46 and not the position of the beams on the sensor array 50. This result is achieved because the gate circuit 88 is open during the time interval between the trigger pulses which occur respectively on the leading edges of the pulses 74 and 76 at the occurrence of a predetermined threshold value 78. Accordingly, for a given thickness which is represented by a given separation between the reflected beams 44 and 46, the gate circuit 88 will be opened for a corresponding interval of time regardless of the placement of the reflected beams and corresponding pulses on the sensor array. Thus the spacing between the instrument and the workpiece is not critical and a substantial variation of the position of the workpiece may be tolerated without affecting the accuracy of measurement. In other words, shifting of the beams 44 and 46 in unison in the horizontal direction, as viewed in FIG. 5, does not affect the measurement. Also it is noted that, by reason of the beams 44 and 46 being in the form of a line, shifting of the beams in the vertical direction, as might result from tilting of the workpiece, does not affect the measurement so long as the beams intercept the array 50.

The analog measurement circuit of FIG. 8 utilizes the reference current source 90 to supply the integrator 92 during the time interval when the gate circuit 88 is open. The integrator 92 accordingly develops a ramp voltage, the magnitude of which is proportional to the time lapse after the first trigger pulse up to a maximum value determined by the occurrence of the second trigger pulse which closes the gate. This maximum value for each scan is memorized and held by the sample and hold circuit 94 and applied through the driver amplifier 96 to the tolerance circuits and alarm.

Alternatively, the measurement circuit of FIG. 9 may be employed and utilizes digital counting to convert the timed trigger pulses to a voltage corresponding to thickness. For this purpose the gate circuit 88 is opened on the occurrence of the first trigger pulse and the clock pulses from clock 102 are applied therethrough to the counter 104. The counter continues to count until the occurrence of the second trigger pulse during the scan and accordingly the total count for the scan is proportional to the time interval between trigger pulses. This registered count is converted by the digital to analog converter 106 to an analog voltage having a magnitude corresponding to the given time interval, and hence the distance between the reflected light beams. The analog voltage from the converter 106 is applied through the driver amplifier 96 to the tolerance circuits and alarm.

In the illustrative embodiment of the invention the scanner is operated at a constant rate of 32 microseconds per photodiode or 32 micro-seconds per 0.002 inch. With an array of 64 photodiodes the scanner performs 500 scans per second which corresponds to 500 independent measurements per second. Accordingly the instrument is admirably suited for continuous monitoring of thickness of workpieces on the production line. If desired, the constants of the system may be selected so that the output signal reads directly in thousandths of inches.

Although the description of this invention has been given with respect to a particular embodiment, it is not to be construed in a limiting sense. Many variations and modifications will now occur to those skilled in the art. For a definition of the invention, reference is made to the appended claims.

The embodiments of the present invention in which an exclusive property or privilege is claimed are defined as follows:

1. Apparatus for measuring the distance between first and second radiation reflective surfaces comprising means projecting a beam of radiation toward said surfaces to produce first and second reflected beams from the first and second surfaces respectively, sensing means including an array of radiation responsive elements extending across the paths of the reflected beams, a static optical system in the path of said beams, said array and said surfaces being subject to displacement into relative positions which result in interception of a first variable one of said elements and a second variable one of said elements by said first and second beams respectively, said first variable one of said elements being selectable from several successive elements dependent upon said relative positions when said measuring is effected, said second variable one of said elements being selectable from the succeeding elements depending upon said distance when said measuring is effected, electronic detector means connected with all of said elements in the sensing means for detecting which of said elements is the first variable one and which is the second variable one of said elements, the distance between the first variable one of said elements and the second variable one of said elements being a measure of the distance between the first and second surfaces, and measuring means connected with said electronic detector means for producing an electrical signal corresponding to the distance between the intercepted elements.

2. The invention as defined in claim 1 and further including tolerance checking means connected with the measuring means for determining whether the electrical signal differs from an established value by more than a predetermined amount.

3. The invention as defined in claim 1 wherein said radiation responsive elements produce an electrical signal corresponding to the amount of radiation impinging thereon, said detector means comprising threshold means adapted when connected to one of said elements to produce a trigger voltage when the electrical signal exceeds a threshold value, and scanning means for sequentially connecting the threshold means to each of said elements.

4. The invention as defined in claim 3 wherein said scanning means comprises an electronic scanner adapted to scan said elements at a predetermined rate, and wherein said measuring means includes timing means for determining the time lapse between trigger voltages produced during a single scan, said time lapse being a measure of the distance between said surfaces.

5. The invention as defined in claim 4 wherein said timing means includes variable voltage producing means for producing a voltage corresponding to said distance.

6. The invention as defined in claim 5 wherein said timing means comprises an electrical reference source, an integrator, and gate means connected between said reference source and said integrator and being connected with said threshold means and responsive to the trigger voltage signals thereof for connecting and disconnecting the integrator and the source whereby a voltage developed by said integrator corresponds to said distance.

7. The invention as defined in claim 5 wherein said timing means comprises a clock pulse generator, a counter, and gate means connected between said generator and said counter and being connected with said threshold means and responsive to the trigger voltages thereof for connecting and disconnecting said pulse generator and said counter whereby the count registered by said counter corresponds to said distance.

8. The invention as defined in claim 7 further including a digital to analog converter connected with said counter for producing a voltage corresponding to said distance.

9. The invention as defined in claim 3 wherein said first and second beams each intercept plural elements with nonuniform radiation intensity, said threshold means being a leading edge threshold detector whereby a trigger voltage is produced corresponding to each beam and the time interval therebetween represents the distance between corresponding points on said beam.

10. The invention as defined in claim 6 including a bi-stable trigger circuit connected between said threshold means and said gating means.

11. The invention as defined in claim 7 and including a bi-stable trigger circuit connected between said threshold means and said gating means.

12. The invention as defined in claim 5 wherein said electronic scanner comprises a shift register connected with said timing means and repetitively scans said elements sequentially at a fixed rate.

13. Apparatus for measuring the thickness of transparent workpiece comprising a light source, means projecting a beam of light from said source toward said workpiece to produce first and second reflected beams from the first and second surfaces of said workpiece, sensing means including a linear array of photosensitive elements extending across the paths of the reflected beams, a static optical system in the path of said beams, said array and said surfaces being subject to displacement into relative positions which result in interception of a first variable one of said elements and a second variable one of said elements by said first and second beams respectively, said first variable one of said elements being selectable from several successive elements dependent upon said relative positions when said measuring is effected, said second variable one of said elements being selectable from the succeeding elements dependent upon said distance when said measuring is effected, said photosensitive elements producing an electrical signal corresponding to the amount of light impinging thereon, detector means including threshold means adapted when connected to one of said elements to produce a trigger voltage when the electrical signal exceeds a threshold value, scanning means for sequentially connecting the threshold means to each of said elements, and measuring means connected with said detector means and adapted to produce an electrical signal corresponding to the distance between said intercepted elements.

14. The invention as defined in claim 13 wherein said sensing means is disposed within a first housing and said light source is disposed within a second housing, said first housing being provided with a transparent window and being adapted to be positioned with said window adjacent said workpiece, a fiber optics cable optically coupled with said light source in the second housing and extending to a point within said first housing in a position to project light from said source at an acute angle onto said workpiece to produce said reflected beams.

15. The invention as defined in claim 14 and further including an opaque mask defining a slit positioned within said first housing opposite the end of said fiber optics cable whereby a line of light is projected therethrough to produce said reflected beams, and a lens disposed within said first housing between said window and said sensing means.

16. The invention as defined in claim 13 including timing means, said electronic scanner being connected with said timing means and adapted to repetitively scan said elements sequentially at a constant rate, variable voltage means for producing a voltage corresponding to the distance measured during each scan, said timing means being connected with said variable voltage means for resetting the same after each scan whereby a moving workpiece may be monitored to determine the thickness thereof at points spaced in the direction of travel of the workpiece.

17. The invention as defined in claim 14 wherein said fiber optics cable projects said line of light directly through said window onto said workpiece, a lens disposed within the first housing between the window and the sensing means, said reflected beams being transmitted through said window and lens onto the sensor array.

18. The invention as defined in claim 14 wherein a first lens and a first mirror are disposed within the first housing between said fiber optics cable and said window whereby said line of light may be transmitted through said window onto the workpiece, a second mirror disposed within said first housing in the path of said reflected beams, a second lens disposed within said housing between said second mirror and said array whereby said first and second beams are projected onto said array.

* * * * *